UNITED STATES PATENT OFFICE.

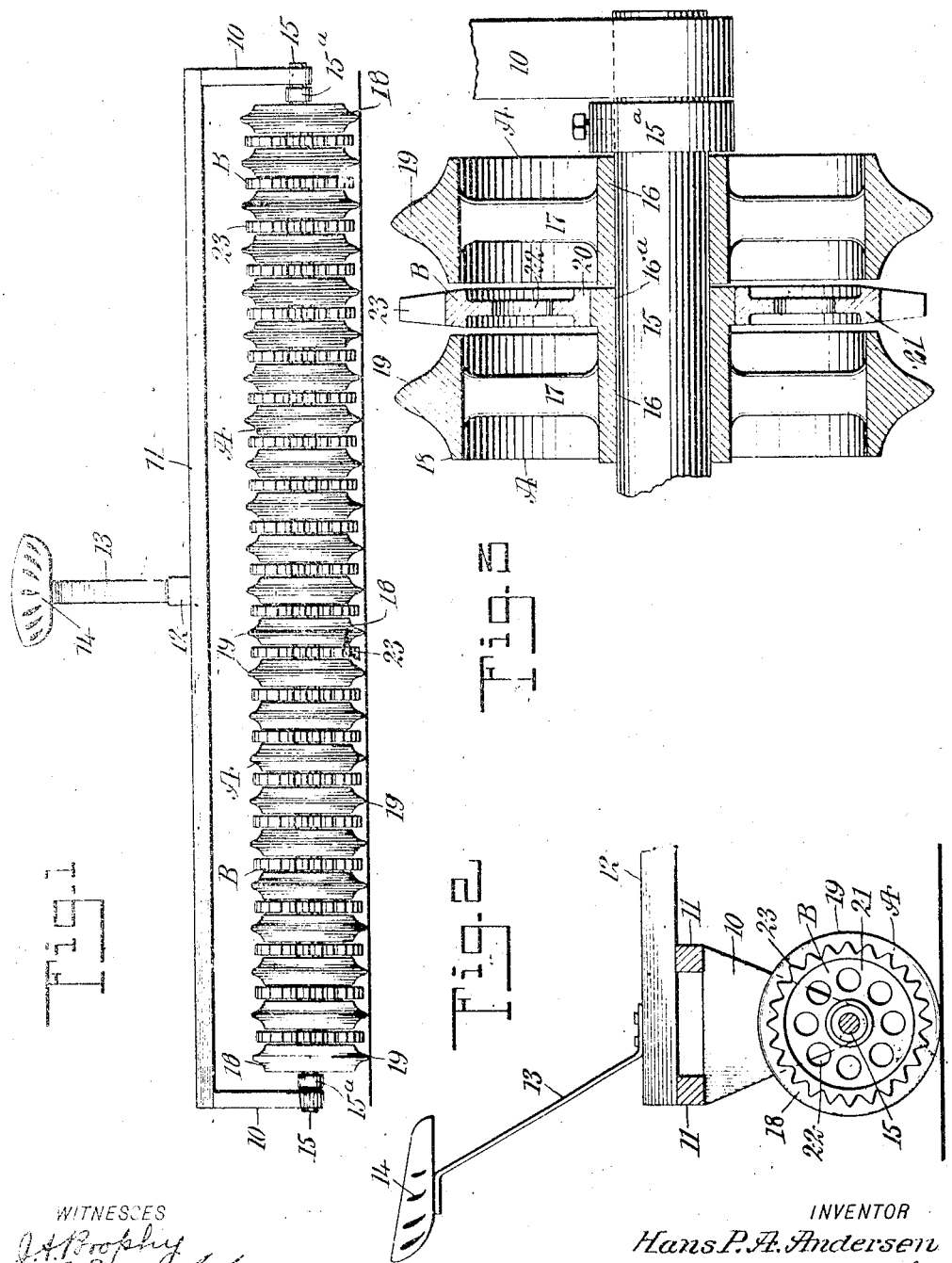

HANS PETER ANDREAS ANDERSEN, OF CUSHING, NEBRASKA.

LAND-ROLLER.

No. 904,913.  Specification of Letters Patent.  Patented Nov. 24, 1908.

Application filed February 3, 1908. Serial No. 414,014.

*To all whom it may concern:*

Be it known that I, HANS P. A. ANDERSEN, a citizen of the United States, and a resident of Cushing, in the county of Howard and State of Nebraska, have invented a new and useful Improvement in Land-Rollers, of which the following is a full, clear, and exact description.

The purpose of the invention is to provide a novel form of land roller, wherein plain disks with a central peripheral grip alternating with toothed disks are mounted upon a common axle, in such manner that they may revolve with the axle and revolve thereon, whereby opposing plain disks form ridges and pack the soil, thus preventing the finer particles from rolling away, while the interposed toothed disks penetrate the crowns of the ridges, thus cultivating the ground and leaving it in the best condition to absorb moisture, and tending to prevent the earth from being washed away.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a front elevation of the improved implement; Fig. 2 is a vertical transverse section taken at a point near the center of the implement; and Fig. 3 is a longitudinal vertical section through sundry of the disks, showing the axle in side elevation, the view being drawn upon an enlarged scale.

The frame of the implement consists of end or cheek pieces 10, which are by preference triangular in general contour, being broadest at the top, and the top portions of these cheek pieces 10 support beams 11, and at the central portion of these beams 11, a tongue 12 is secured in any suitable or approved manner, and this tongue in its turn supports the standard 13 of the driver's seat 14. An axle 15 is journaled in the lower portions of the cheek pieces 10, and the said axle may be mounted to turn in its bearings or it may be secured therein.

On the aforesaid axle 15, a series of disks is mounted. These disks may turn upon the axle or may turn with the axle, but they are mounted to revolve. The disks are in two series, a series A and a series B. The series A is much wider than the series B, and the disks of the series are alternately arranged. The disks of the series A are made quite wide and consist each of a hub 16 and spokes 17 extending from the hub to meet a rim 18, and the rim 18 of each disk A is provided with a centrally located rib 19, and the outer faces of the peripheral surfaces of the rim 18 of the disk A slope upward, preferably in curved lines from the sides of the peripheral portion of said disks to the apex of the ribs 19 of said disks, so that when the implement is drawn along it will form ridges in the ground. The disks are held in place on the axle 15 by means of collars 15ª, secured to the axle between the cheek pieces 10 and the outer disks of the series, and by preference the disks A are the outer disks. Each of the disks except the last disk to the right of Fig. 1 of the series A is provided with an extension 16ª from one side of its hub, as is shown in Fig. 3, and the disks B are mounted to turn loosely on said projections. Each disk B consists of a hub 20 and a body 21 that is preferably provided with series of apertures 22, so as to render these disks as light as possible consistent with strength, and each disk B is provided with a series of peripheral teeth 23, and by preference the disks B are of lesser diameter than the diameter of the disks A between which they are located. Thus as an implement constructed as described is drawn along, the opposing disks A create or form ridges in the ground, while the interposed disks B by reason of their toothed peripheral surface, produce apertures or openings in the crowns of the said ridges whereby to receive moisture, while the disks A pack the earth so as to prevent the lighter particles from being blown away. By reason of the aforesaid construction of the roller, the ground is so prepared that it is receptive of moisture and at the same time the particles of the earth are firmly packed, so that in the event of a heavy rain storm the earth is not liable to be washed away and the ground will retain moisture longer than if treated in the customary manner. As the series of disks revolve on the axle, the roller is readily turned on the spot and easy running of the roller is insured.

Having thus described my invention, I claim as new and desire to secure by Letters Patent,—

1. In an agricultural implement, a frame, an axle carried by the frame, a series of plain disks mounted to turn upon or with the said axle, the said plain disks being provided with centrally located peripheral ribs, the outer peripheral faces of the disks being curved in opposite directions from said ribs, said disks having a cylindrical extension from one side of the hub, and a second series of disks interposed between the said plain disks, each of said disks being journaled on the extension of the adjacent disk of the first series, the interposed series of disks being provided with peripheral teeth, whereby opposing plain disks create ridges in the ground over which the implement is passed and the interposed toothed disks puncture the crowns of the said ridges.

2. An agricultural implement, comprising a frame, a series of revoluble plain disks having peripheral central ribs, and a series of revoluble toothed disks, the disks of the series being approximately of the same diameter and alternately arranged and the hubs of the disks of one series being provided at one end with extensions, upon which the disks of the other series are loosely mounted.

In testimony whereof I have signed my name to this specification in the presence of two subscribing witnesses.

HANS PETER ANDREAS ANDERSEN.

Witnesses:
J. A. LARSEN,
WM. C. FREDRICKSEN.